(12) United States Patent
Sakae et al.

(10) Patent No.: US 11,513,884 B2
(45) Date of Patent: Nov. 29, 2022

(54) INFORMATION PROCESSING APPARATUS, CONTROL METHOD, AND PROGRAM FOR FLEXIBLY MANAGING EVENT HISTORY

(71) Applicant: NEC Corporation, Tokyo (JP)

(72) Inventors: Yoshiaki Sakae, Tokyo (JP); Kazuhiko Isoyama, Tokyo (JP); Jun Nishioka, Tokyo (JP); Etsuko Ichihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/279,155

(22) PCT Filed: Sep. 26, 2018

(86) PCT No.: PCT/JP2018/035746
§ 371 (c)(1),
(2) Date: Mar. 24, 2021

(87) PCT Pub. No.: WO2020/065778
PCT Pub. Date: Apr. 2, 2020

(65) Prior Publication Data
US 2021/0397498 A1 Dec. 23, 2021

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0784* (2013.01)

(58) Field of Classification Search
CPC ............. G06F 11/0709; G06F 11/0781; G06F 11/0784; G06F 11/0787; G06F 11/079; G06F 11/3476
See application file for complete search history.

(56) References Cited

U.S. PATENT DOCUMENTS

| | | | | |
|---|---|---|---|---|
| 9,535,981 | B2 * | 1/2017 | Basak | G06F 16/1748 |
| 9,665,420 | B2 * | 5/2017 | Jilani | G06F 11/0751 |
| 10,474,523 | B1 * | 11/2019 | Taig | G06F 11/263 |
| 11,132,356 | B2 * | 9/2021 | Pilkington | H04L 67/16 |
| 2013/0227352 | A1 * | 8/2013 | Kumarasamy | G06F 11/1461 |
| | | | | 714/47.1 |

(Continued)

FOREIGN PATENT DOCUMENTS

| | | |
|---|---|---|
| JP | 2013-065244 A | 4/2013 |
| JP | 2014-146074 A | 8/2014 |
| WO | 2015/141220 A1 | 9/2015 |

OTHER PUBLICATIONS

International Search Report for PCT Application No. PCT/JP2018/035746, dated Nov. 27, 2018.

*Primary Examiner* — Marc Duncan
(74) *Attorney, Agent, or Firm* — Sughrue Mion, PLLC (57) ABSTRACT

An information processing apparatus 2000 executes analysis for an event history set (10). The event history set (10) is a set of a plurality of event histories (12). The event history (12) is information relating to an event generated in a target computer system. The information processing apparatus 2000 selects, based on a result of the analysis, an event history (12) to be excluded from deletion targets. The information processing apparatus (2000) deletes, from the event history set (10), an event history (12) other than the event history (12) excluded from the deletion targets.

11 Claims, 5 Drawing Sheets

(56) References Cited

U.S. PATENT DOCUMENTS

| | | | |
|---|---|---|---|
| 2014/0317286 A1* | 10/2014 | Masuda | G06F 11/3051 |
| | | | 709/224 |
| 2015/0254285 A1* | 9/2015 | Achar | G06F 16/215 |
| | | | 707/692 |
| 2017/0075746 A1 | 3/2017 | Nomura et al. | |
| 2017/0075749 A1 | 3/2017 | Ambichl et al. | |
| 2019/0324649 A1* | 10/2019 | Rodgers | G06F 11/3072 |

* cited by examiner

| SUBJECT INFORMATION 202 | | OBJECT INFORMATION 204 | | CONTENT INFORMATION 206 | GENERATION TIME 207 |
|---|---|---|---|---|---|
| PROCESS NAME 208 | PATH 210 | TYPE 212 | IDENTIFICATION INFORMATION 214 | | |
| process A | C¥dir11/dir12/a1.exe | PROCESS | D¥dir21/dir22/a2.exe | START | 2018/1/10 10:05:24 |
| process B | C¥dir13/dir14/b1.exe | FILE | D¥dir23/b2.conf | WRITE | 2018/1/10 10:06:02 |
| process C | C¥dir15/dir16/c1.exe | SOCKET | socket1 | READ | 2018/1/11 9:06:02 |
| ... | ... | ... | ... | ... | ... |

200

INFORMATION PROCESSING APPARATUS, CONTROL METHOD, AND PROGRAM FOR FLEXIBLY MANAGING EVENT HISTORY

This application is a National Stage Entry of PCT/JP2018/035746 filed on Sep. 26, 2018, the contents of all of which are incorporated herein by reference, in their entirety.

TECHNICAL FIELD

The present invention relates to management of a history.

BACKGROUND ART

Various types of techniques for managing a history of an event have been developed. PTL 1, for example, discloses a technique for managing a log of a search-target event by using a circular buffer. Due to a circular buffer, when a log is written down to a tail end of a buffer, a return is made to a top of the buffer, and an existing log is overwritten and thereby writing of a log is continued. However, with regard to an area where an event of a predetermined ID is stored, overwriting is not executed.

PTL 2 discloses a technique for extracting, when a data amount of a log is equal to or more than a threshold, an error log and a log related to the error log from a log file, and deleting a log other than the extracted log from the log file. Herein, a log related to the error log is a log recorded for n seconds before/after the error log or a log recorded for n events before/after the error log.

CITATION LIST

Patent Literature

[PTL 1] Japanese Patent Application Publication No. 2014-146074
[PTL 2] Japanese Patent Application Publication No. 2013-065244

SUMMARY OF INVENTION

Technical Problem

According to PTLs 1 and 2, a log other than a log of a predetermined event is deleted. Further, according to PTL 2, a log with respect to n events or n seconds before/after the predetermined event is also not deleted. However, a log to be left in a log file is not limited to only a log of the predetermined event and a log existing around the event.

The present invention has been made in view of the above-described problem, and one of objects of the present invention is to provide a technique for flexibly managing a history of an event.

Solution to Problem

An information processing apparatus according to the present invention includes: 1) an analysis unit that executes analysis for an event history set including a plurality of event histories; 2) a selection unit that selects, from the event history set, an event history to be excluded from deletion targets, based on a result of the analysis; and 3) a deletion unit that deletes, from the event history set, an event history other than the selected event history.

A control method according to the present invention is executed by a computer. The control method includes: 1) an analysis step of executing analysis for an event history set including a plurality of event histories; 2) a selection step of selecting, from the event history set, an event history to be excluded from deletion targets, based on a result of the analysis; and 3) a deletion step of deleting, from the event history set, an event history other than the selected event history.

A program according to the present invention causes a computer to execute each of steps included in the control method according to the present invention.

Advantageous Effects of Invention

According to the present invention, a technique for flexibly managing a history of an event is provided.

BRIEF DESCRIPTION OF DRAWINGS

The above-described object, and other objects, features, and advantageous effects will become more apparent from a suitable example embodiment described below and the following accompanying drawings.

EXAMPLE EMBODIMENT

Hereinafter, an example embodiment of the present invention is described by using the accompanying drawings. Note that in all of the drawings, a similar component is assigned with a similar reference sign, and description thereof will not be repeated as appropriate. Further, except as specifically described, in each block diagram, each block is not a configuration of a hardware unit but represents a configuration of a function unit.

First Example Embodiment

<Outline>

Figure 1:
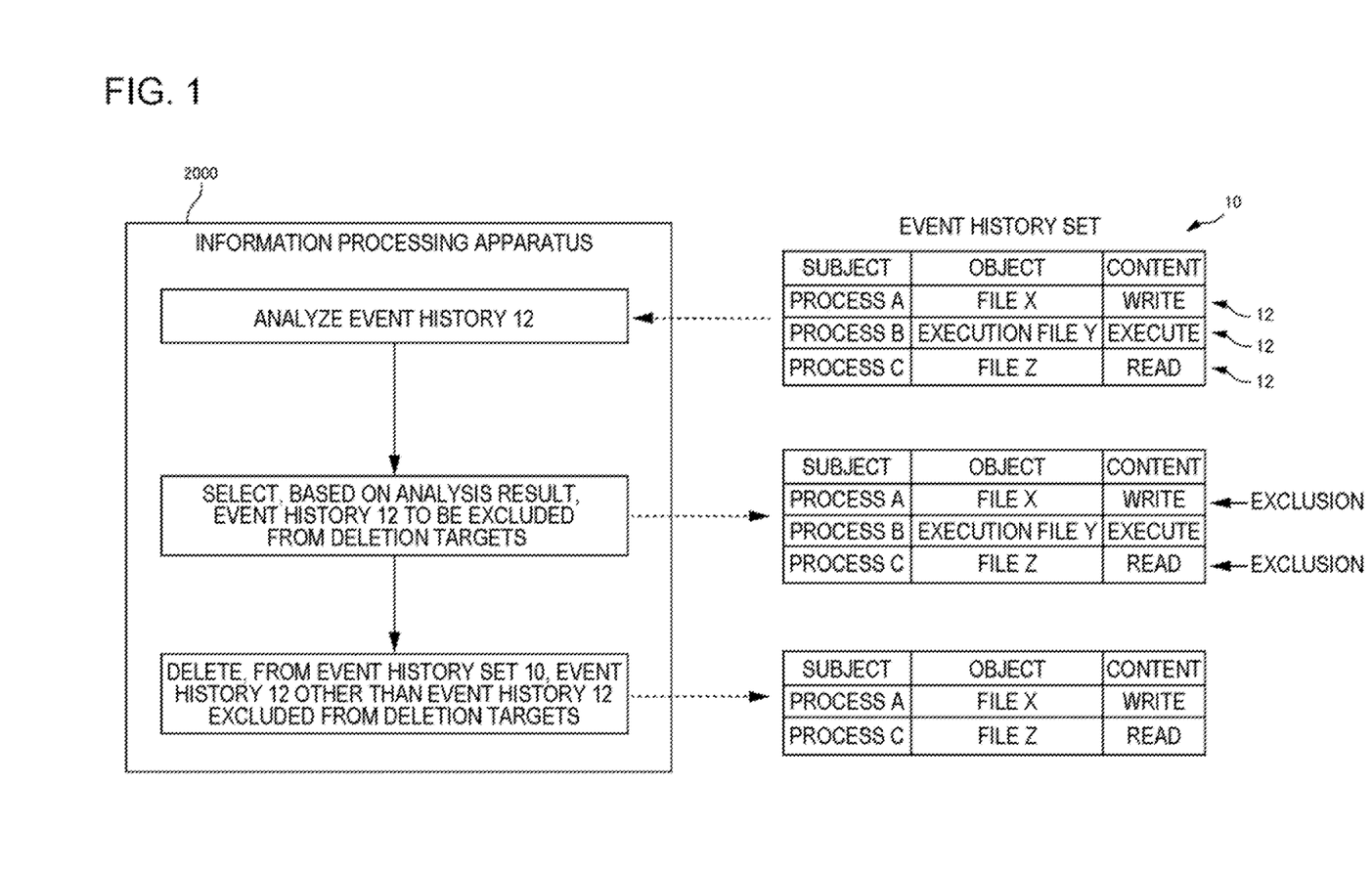
FIG. 1 is a diagram illustrating an outline of an operation of an information processing apparatus according to a first example embodiment.

FIG. 1 is a diagram illustrating an outline of an operation of an information processing apparatus according to a first example embodiment. FIG. 1 is a conceptual diagram for easily understanding an operation of an information processing apparatus 2000, and does not specifically limit the operation of the information processing apparatus 2000.

The information processing apparatus 2000 handles an event history set 10. An event history set 10 is a set of a plurality of event histories 12. The event history 12 is information relating to an event generated in a target computer system (hereinafter, a target system). The target system includes any one or more machines. The machine may be a physical machine or may be a virtual machine. The event represents, for example, an activity (an access to a file or another process, and the like) executed by a process operating on the machine included in the target system.

The information processing apparatus 2000 executes analysis for the event history set 10, and selects, based on the result, an event history 12 to be excluded from deletion targets. The information processing apparatus 2000 deletes, from the event history set 10, an event history 12 other than the event history 12 excluded from the deletion targets.

For example, in the example of FIG. 1, a selection unit 2040 selects, from among three event histories 12, a first event history 12 and a third event history 12. Therefore, a deletion unit 2060 deletes a second event history 12 from an event history set 10.

<Advantageous Effect>

When an event history 12 is not deleted from an event history set 10, the event history 12 included in the event history set 10 continues increasing. As a result, a storage area of a storage apparatus storing the event history set 10 becomes insufficient. However, an event history 12 necessary in a future is also included in the event history set 10, and therefore it is necessary to determine, based on any method, such an event history 12 not to be deleted.

For this reason, the information processing apparatus 2000 according to the present example embodiment executes analysis for an event history set 10, selects an event history 12 to be excluded from deletion targets, and deletes, from the event history set 10, an event history 12 having not been selected. By doing so, while a computer resource necessary for storing an event history 12 is reduced by decreasing the number of event histories 12, the computer resource can continue to be maintained for an event history 12 necessary in a future.

Further, an event history 12 to be excluded from deletion targets is selected based on an analysis result, and therefore an event history 12 to be excluded from deletion targets can be flexibly selected, differently from a case where only an event history 12 in which a predetermined identifier is recorded for an event history 12 and an event history 12 recorded around the event history 12 can be deleted from deletion targets. Therefore, an event history 12 can be flexibly managed.

Hereinafter, the information processing apparatus 2000 according to the present example embodiment is described in more detail.

<An Example of a Function Configuration of the Information Processing Apparatus 2000>

Figure 2:
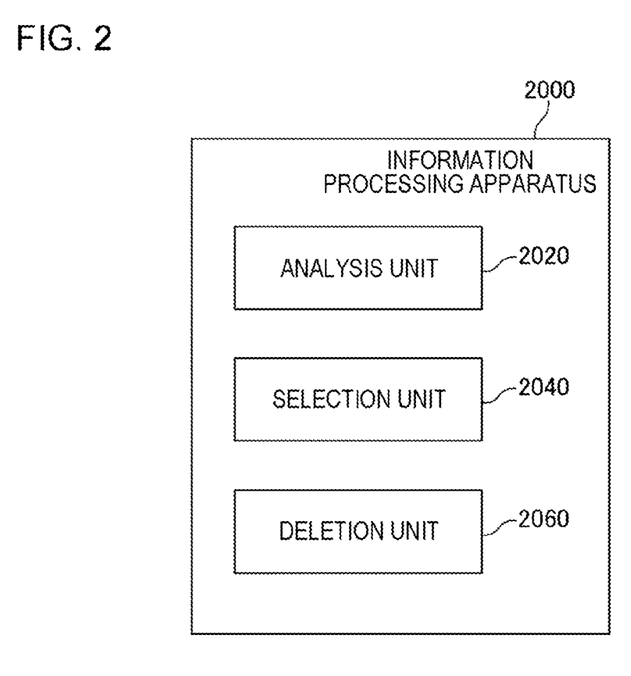
FIG. 2 is a diagram illustrating a configuration of the information processing apparatus according to the first example embodiment.

FIG. 2 is a diagram illustrating a configuration of the information processing apparatus 2000 according to the first example embodiment. The information processing apparatus 2000 includes an analysis unit 2020, the selection unit 2040, and the deletion unit 2060. The analysis unit 2020 executes analysis for an event history set 10. The selection unit 2040 selects, from the event history set 10, an event history 12 to be excluded from deletion targets, based on a result of the analysis. The deletion unit 2060 deletes, from the event history set 10, an event history 12 (i.e., an event history 12 having not been selected) other than the selected event history 12.

<A Hardware Configuration of the Information Processing Apparatus 2000>

Each function-configuring unit of the information processing apparatus 2000 may be achieved by hardware (e.g., a hard-wired electronic circuit, and the like) for achieving each function-configuring unit or may be achieved by a combination of hardware and software (e.g., a combination of an electronic circuit and a program for controlling the electronic circuit, and the like). Hereinafter, a case where each function-configuring unit of the information processing apparatus 2000 is achieved by a combination of hardware and software is further described.

Figure 3:
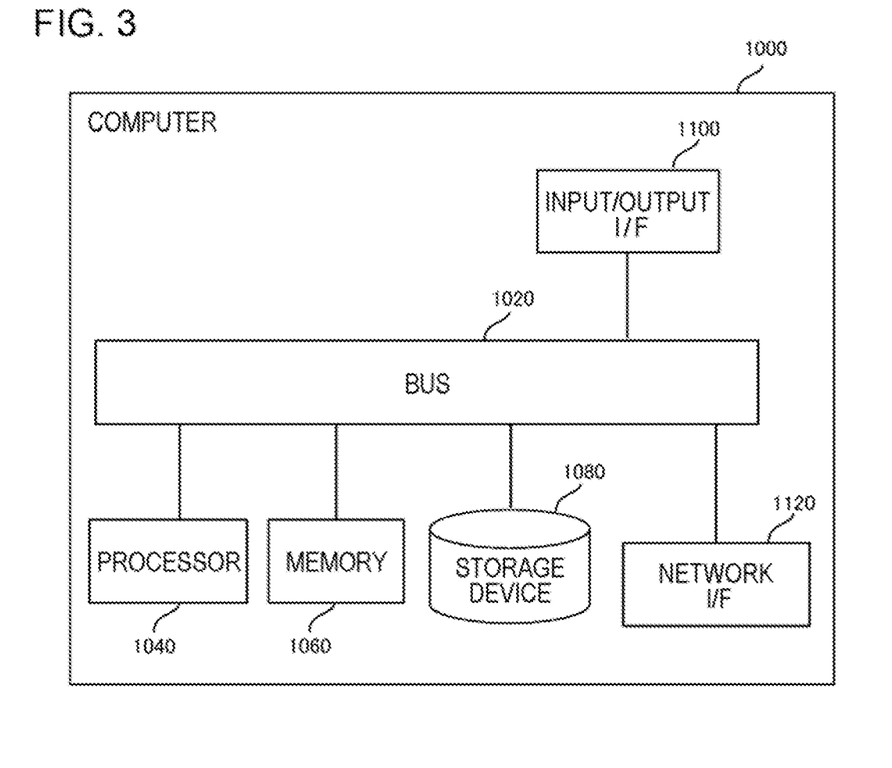
FIG. 3 is a diagram illustrating a computer for achieving an information processing apparatus.

FIG. 3 is a diagram illustrating a computer 1000 for achieving the information processing apparatus 2000. The computer 1000 is any computer. The computer 1000 is, for example, a stationary computer such as a personal computer (PC) and a server machine. In addition thereto, the computer 1000 is, for example, a portable computer such as a smartphone and a tablet terminal. The computer 1000 may be a dedicated computer designed for achieving the information processing apparatus 2000, or may be a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit/receive data to/from each other. However, a method of mutually connecting the processor 1040 and the like is not limited to bus connection.

The processor 1040 includes various types of processors such as a central processing unit (CPU), a graphics processing unit (GPU), and a field-programmable gate array (FPGA). The memory 1060 is a main storage apparatus achieved by using a random access memory (RAM), and the like. The storage device 1080 is an auxiliary storage apparatus achieved by using a hard disk, a solid state drive (SSD), a memory card, a read only memory (ROM), and the like.

The input/output interface 1100 is an interface for connecting the computer 1000 and an input/output device. The input/output interface 1100 is connected to, for example, an input apparatus such as a keyboard and an output apparatus such as a display apparatus.

The network interface 1120 is an interface for connecting the computer 1000 to a communication network. The communication network is, for example, a local area network (LAN) or a wide area network (WAN). A method in which the network interface 1120 is connected to the communication network may be wireless connection or may be wired connection.

The storage device 1080 stores a program module for achieving each function-configuring unit of the information processing apparatus 2000. The processor 1040 reads each of the program modules onto the memory 1060 and executes the read program module, and thereby achieves a function relevant to each of the program modules.

<A Flow of Processing>

Figure 4:
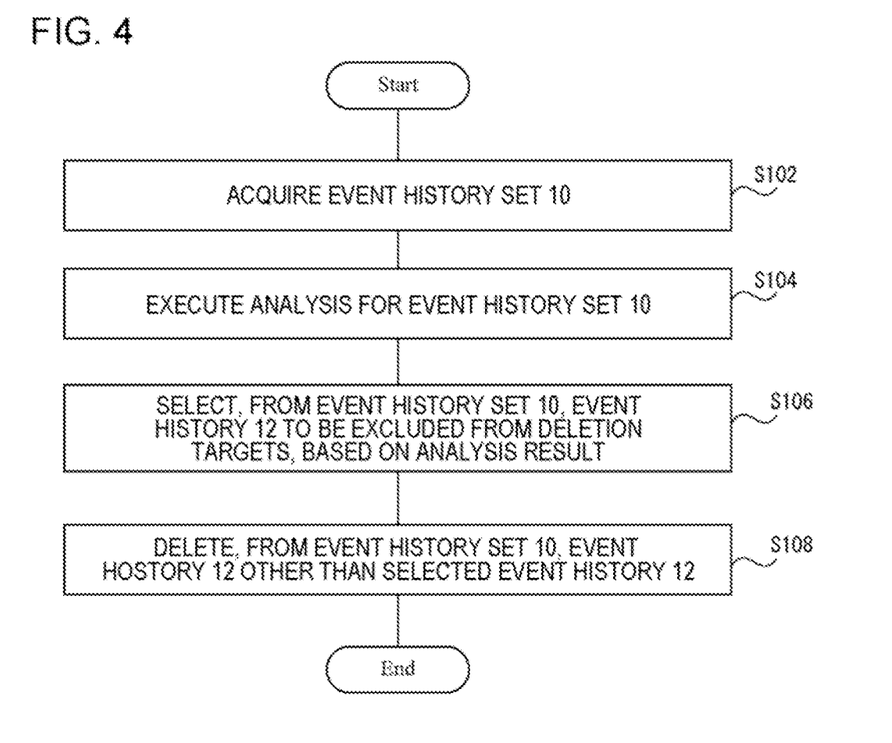
FIG. 4 is a flowchart illustrating a flow of processing executed by the information processing apparatus according to the first example embodiment.

FIG. 4 is a flowchart illustrating a flow of processing executed by the information processing apparatus 2000 according to the first example embodiment. The analysis unit 2020 acquires an event history 10 (S102). The analysis unit 2020 executes analysis for the event history set 10 (S104). The selection unit 2040 selects, from the event history set 10, an event history 12 to be excluded from deletion targets, based on a result of the analysis (S106). The deletion unit 2060 deletes, from the event history set 10, an event history 12 other than the selected event history 12 (S108).

Note that a flow of processing executed by the information processing apparatus 2000 is not limited to the flow illustrated in FIG. 4. For example, processing of the selection unit 2040 is not necessarily executed every time the analysis unit 2020 executes the analysis. For example, processing of the analysis unit 2020 and the processing of the selection unit 2040 are repeatedly executed at cycles different from each other. In this case, a cycle of the processing of the analysis unit 2020 is caused to be shorter than a cycle of the processing of the selection unit 2040.

<Regarding an Event History 12>

An event history 12 is information relating to an event generated on a target system (on a machine included in the target system) at a certain time in a past. The event history 12 indicates a generation time of an event and a content of the event in association with each other.

An event history 12 represents, for example, a history of an activity of a process operating on a computer system. When a certain process operates in which another process is an object, these processes may operate mutually on the same operating system (OS), or may operate on OSs different from each other. As an example of the latter, it is conceivable that, for example, by using a socket interface, a certain process communicates with a different process operating on another OS.

An event is identified, for example, by information representing four elements including a subject, an object, an activity content, and a generation time. Therefore, an event history 12 indicates, for example, a combination of subject information representing a subject, object information representing an object, content information representing a content of an activity, and a generation time.

The subject information is, for example, information identifying a process that generates the event. Hereinafter, the information identifying a process is referred to as process identification information. The process identification information indicates, for example, a name of a process. In addition thereto, the process identification information is, for example, a process identifier (ID), a name and a path of an executable file of a program relevant to a process, a hash value and a digital signature of an executable file, a name of an application implemented by an executable file, and the like. Note that the process identification information may be a combination of a plurality of identifiers such as a combination of a path of an executable file and a process ID.

The object information includes, for example, a type of the object and identification information. The type of an object is, for example, a process, a file, or a socket. When an object is a process, the object information includes the process identification information of the process.

When an object is a file, the object information includes information (hereinafter, referred to as file identification information) identifying the file. The file identification information is, for example, a name and a path of the file. Further, when an object is a file, the object information may be a hash value of the file, a combination of identification information of a file system and identification information (an inode number and an object ID) of a disk block configuring the file on the file system, or the like.

When an object is a socket, the object information includes, for example, an identifier assigned to the socket.

The content information includes, for example, an identifier previously assigned to various types of activity contents. The identifiers different from each other are assigned to contents of activities such as "starting a process", "stopping a process", "opening a file", "reading data from a file", "writing data on a file", "opening a socket", "reading data from a socket", and "writing data on a socket". Note that an access to a socket indicates an access to another apparatus associated with the socket.

Figure 5:
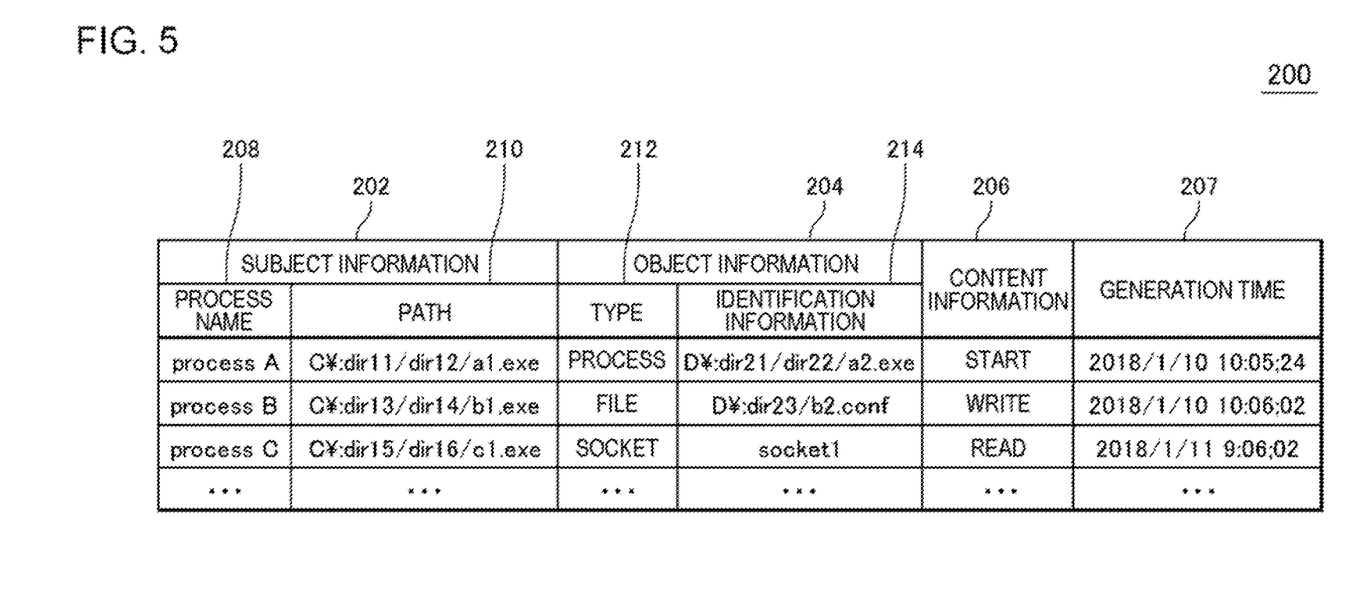
FIG. 5 is a diagram illustrating an event history set by using a table format.

FIG. 5 is a diagram illustrating an event history set 10 by using a table format. Hereinafter, a table in FIG. 5 is referred to as a table 200. Each of records in the table 200 represents one event history 12. The table 200 includes subject information 202, object information 204, content information 206, and a generation time 207. The subject information 202 includes a process name 208 and a path 210. The object information 204 includes a type 212 and identification information 214. A generation time 207 indicates a time at which an event is generated.

Herein, an event history 12 is generated by recording an activity of a process on a target system. As a technique for recording an activity of a process, an existing technique is usable.

<Acquisition of an Event History Set 10: S102>

The analysis unit 2020 acquires an event history set 10 (S102). The event history set 10 is stored in a storage apparatus accessible from the analysis unit 2020. The storage apparatus is referred to as a history storage apparatus. The history storage apparatus may be disposed inside of the information processing apparatus 2000, or may be disposed outside of the information processing apparatus 2000.

The event history set 10 acquired by the analysis unit 2020 may include all event histories 12 stored in the history storage apparatus or may include some event histories 12. In a case of the latter, the analysis unit 2020 acquires, as an event history set 10, for example, a set including only an event history 12 not yet set as an analysis target. In this case, an event history 12 having been analyzed is associated with a flag indicating that the event history 12 has been already analyzed, and the associated event history 12 is stored.

<Analysis of an Event History Set 10: S104>

The analysis unit 2020 analyzes for the event history set 10 (S104). The analysis unit 2020 analyzes, for each event history 12 included in the event history set 10, for example, an abnormal degree of an event indicated by the event history 12. The analysis unit 2020 determines an event history 12 indicating an abnormal event.

As a method of determining an event history 12 indicating an abnormal event, various methods are employable. For example, feature information representing a feature of the abnormal event is previously determined. The analysis unit 2020 determines whether each event history 12 is matched with a feature of the abnormal event indicated by the feature information. The analysis unit 2020 determines, as an event history 12 indicating the abnormal event, an event history 12 indicating an event matched with the feature of the abnormal event. Note that detail of the feature information is described later.

In addition thereto, the analysis unit 2020 computes, for each event history 12, for example, an abnormal score in which the abnormal degree of an event indicated by the event history 12 is quantified. The analysis unit 2020 determines, as an event history 12 indicating the abnormal event, an event history 12 in which the abnormal score is equal to or more than a threshold.

As a method of computing an abnormal score, various methods are employable. In the feature information, for example, a feature of an event and an abnormal score are associated. The analysis unit 2020 regards the abnormal score indicated by the feature information matched with an event history 12 as an abnormal score of an event indicated by the event history 12.

Note that when there are a plurality of pieces of feature information matched with a certain event history 12, the analysis unit 2020 computes, based on an abnormal score indicated by each of a plurality of pieces of matched feature information, an abnormal score of the event history 12. The analysis unit 2020 regards, as an abnormal score of the event history 12, for example, a value in which abnormal scores indicated by a plurality of pieces of feature information are integrated, a maximum value among abnormal scores indicated by a plurality of pieces of feature information, and the like.

Further, the analysis unit 2020 may determine one or more other events having a causal relation with an event history 12 indicating an abnormal event. Specifically, the analysis unit 2020 executes a causal analysis in which an abnormal event is a starting point. By doing so, another event having the causal relation with the abnormal event can be determined. Note that as a specific method of the causal analysis, an existing technique is usable.

The analysis unit 2020 generates, by the causal analysis, for example, a control flow graph or a data flow graph connecting an abnormal event and each event having a causal relation with the event. Another event having the causal relation with the abnormal event is an event included in the control flow graph or the data flow graph generated by using the abnormal event as a starting point. Note that as a specific method of generating a control flow graph or a data flow graph, an existing technique is usable.

《Regarding Feature Information》

As described above, in order to determine an abnormal event, the feature information is used. As a feature of the abnormal event indicated by the feature information, various features are employable. The feature information indicates, for example, information (the subject information in an event history 12) determining a subject of an event. Specifically, the feature information indicates, as a subject of an event, identification information (e.g., identification information of malware, and the like) of an application operating abnormally. In this case, when the subject information of a certain event history 12 is matched with identification information of an application indicated by the feature information, the event history 12 is determined as an event history 12 indicating the abnormal event.

Note that only when an application is executed in a specific execution environment (an OS or middleware), the application may be intended to be handled as a subject of the abnormal event. For this reason, the feature information may indicate a combination of identification information of an application and the execution environment of the application. In this case, when subject information of an event history 12 is matched with the identification information of the application indicated by the feature information and an execution environment of a subject is matched with the execution environment indicated by the feature information, the event history 12 is determined as an event history 12 indicating the abnormal event. Note that when the execution environment is included in the feature information, an event history 12 is caused to also include the execution environment.

In addition thereto, the feature information indicates, for example, information (the object information in an event history 12) determining an object of an event. Specifically, as the object of an event, a specific file or communication destination may be indicated. The specific file is, for example, a file storing personal information and confidential information. The specific communication destination is determined, for example, by an IP address known as a communication destination of malware. Note that it may be possible to define a normal communication destination and thereby handle, as being abnormal, an event having a communication destination other than the normal communication destination.

The feature information may indicate a combination of two or more of the subject information, the object information, and the content information (information representing an activity content). When, for example, an application A that originally only reads data executes an activity (e.g., write of data or start of another process) other than reading of data, the activity is conceivable as an abnormal activity. In this case, for example, a combination of "subject information=application A, content information=other than reading" is indicated in the feature information.

<Selection of an Event History 12: S106>

The selection unit 2040 selects an event history 12 to be excluded from deletion targets (S106). When, for example, the analysis unit 2020 determines an event history 12 indicating an abnormal event, the selection unit 2040 selects the event history 12 indicating the abnormal event as an even history 12 to be excluded from deletion targets.

The abnormal event has a high probability in future use such as being analyzed later in more detailed. Therefore, an event history 12 indicating the abnormal event is excluded from deletion targets, and thereby an event history 12 having a high probability in future use can continue to be maintained.

Further, the selection unit 2040 may exclude, from deletion targets, in addition to an event history 12 indicating the abnormal event, an event history 12 indicating an event having a causal relation with the event. It is assumed that the analysis unit 2020 determines, for example, by the above-described causal analysis, one or more other events having the causal relation with the abnormal event. In this case, the analysis unit 2020 selects, as an event history 12 to be deleted from deletion targets, an event history 12 indicating the abnormal event and an event history 12 indicating an event determined as having the causal relation with the event.

When an abnormal event is analyzed in detail, there is a possibility that it is necessary to analyze in detail a cause of generation of the event, an influence of the abnormal event, and the like. For this reason, not only an abnormal event but also a history of an event having a causal relation with the event are excluded from deletion targets, and thereby an event history 12 having a high probability in use for detailed analysis of the abnormal event can continue to be maintained.

For example, a flag indicating being selected is set for the selected event history 12. For example, a column designated as an exclusion flag is prepared in the table 200, and 0 is set as an initial value. The selection unit 2040 updates, to 1, the exclusion flag of an event history 12 excluded from deletion targets.

However, information for determining the selected event history 12 may be managed by a separate method, instead of being included in an event history 12. The selection unit 2040 generates, for example, a list indicating an identifier (e.g., a record ID, and the like) of each event history 12 excluded from deletion targets and stores the generated list in any storage apparatus.

<Deletion of an Event History 12: S108>

The deletion unit 2060 deletes, from the history storage apparatus, an event history 12 (i.e., an event history 12 having not been deleted from deletion targets) having not been selected by the selection unit 2040 (S108). However, the deletion unit 2060 may delete, from among event histories 12 having not been excluded from deletion targets, only an event history 12 in which a predetermined time or longer passes from an event generation time. The predetermined time may be previously set in the deletion unit 2060, or may be stored in a storage apparatus accessible from the deletion unit 2060.

Further, the deletion unit 2060 may store an event history 12 being a deletion target in a storage apparatus (hereinafter, a backup storage apparatus) separate from the history storage apparatus, and delete the event history 12 from the history storage apparatus. By doing so, an operation is made possible in which, for example, only an event history 12 indicating an event having a high abnormal degree is left in the history storage apparatus and other event histories 12 are evacuated in the backup storage apparatus. At that time, a system configuration in which, for example, "as the history storage apparatus, a storage apparatus having high access speed, although being expensive, is used, and as the backup storage apparatus, a storage apparatus having low access speed, although being inexpensive, is used" is employed, and thereby cost performance in managing an event history 12 can be increased.

While the example embodiments according to the present invention have been described with reference to the drawings, the example embodiments are only exemplification of the present invention, and a combination of each of the above-described example embodiments or various configurations other than the above-described example embodiments can also be employed.

A part or the whole of the above-mentioned example embodiment may also be described in supplementary notes below, which is not limited thereto.

1. An information processing apparatus, including:
   an analysis unit that executes analysis for an event history set including a plurality of event histories;
   a selection unit that selects, from the event history set, an event history to be excluded from deletion targets, based on a result of the analysis; and
   a deletion unit that deletes, from the event history set, an event history other than the selected event history.

2. The information processing apparatus according to supplementary note 1, wherein
   the analysis unit analyzes an abnormal degree of an event represented by the event history, and
   the selection unit selects the event history indicating an abnormal event.

3. The information processing apparatus according to supplementary note 2, wherein
   the analysis unit executes a causal analysis for the event history indicating an abnormal event, and
   the selection unit deletes, from deletion targets, the event history indicating an abnormal event and the event history indicating an event having a causal relation with the event indicated by the former event history.

4. The information processing apparatus according to supplementary note 3, wherein
   the analysis unit generates a control flow graph or a data flow graph including an abnormal event, and excludes, from deletion targets, an event history relevant to each of events included in the generated control flow graph or data flow graph.

5. The information processing apparatus according to any one of supplementary notes 1 to 4, wherein
   the deletion unit deletes an event history representing an event a predetermined period or more before, from among event histories other than the event history selected by the selection unit.

6. The information processing apparatus according to any one of supplementary notes 1 to 5, wherein
   the analysis unit repeatedly executes the analysis at a predetermined timing.

7. A control method executed by a computer, including:
   an analysis step of executing analysis for an event history set including a plurality of event histories;
   a selection step of selecting, from the event history set, an event history to be excluded from deletion targets, based on a result of the analysis; and
   a deletion step of deleting, from the event history set, an event history other than the selected event history.

8. The control method according to supplementary note 7, further including:
   analyzing, in the analysis step, an abnormal degree of an event represented by the event history; and
   selecting, in the selection step, the event history indicating an abnormal event.

9. The control method according to supplementary note 8, further including:
   executing, in the analysis step, a causal analysis for the event history indicating an abnormal event; and
   deleting, in the selection step, from deletion targets, the event history indicating an abnormal event and the event history indicating an event having a causal relation with the event indicated by the former event history.

10. The control method according to supplementary note 9, further including
    generating, in the analysis step, a control flow graph or a data flow graph including an abnormal event, and excluding, from deletion targets, an event history relevant to each of events included in the generated control flow graph or data flow graph.

11. The control method according to any one of supplementary notes 7 to 10, further including
    deleting, in the deletion step, an event history representing an event a predetermined period or more before, from among event histories other than the event history selected by the selection step.

12. The control method according to any one of supplementary notes 7 to 11, further including
    repeatedly executing, in the analysis step, the analysis at a predetermined timing.

13. A program causing a computer to execute each step of the control method according to any one of supplementary notes 7 to 12.

What is claimed is:

1. An information processing apparatus, comprising:
   one or more memories storing instructions; and
   one or more processors configured to execute the instructions to implement:
   an analysis unit that executes analysis for an event history set including a plurality of event histories;
   a selection unit that selects, from the event history set, an event history to be excluded from deletion targets, based on a result of the analysis; and
   a deletion unit that deletes, from the event history set, an event history other than the selected event history,
   wherein the analysis unit matches events represented by each event history with a feature of an abnormal event indicated by predetermined feature information to calculate an abnormal degree for each event history, obtains an abnormal score for each event history based on the abnormal degree for each event history, compares the abnormal score for each event history with a threshold score, and determines an event history with the abnormal score being equal to or more than the threshold score as an abnormal event, and
   the selection unit selects the event history indicating the abnormal event.

2. The information processing apparatus according to claim 1, wherein the analysis unit executes a causal analysis for the event history indicating an abnormal event, and the selection unit deletes, from deletion targets, the event history indicating an abnormal event and the event history indicating an event having a causal relation with the event indicated by the former event history.

3. The information processing apparatus according to claim 2, wherein the analysis unit generates a control flow graph or a data flow graph including an abnormal event, and excludes, from deletion targets, an event history relevant to each of events included in the generated control flow graph or data flow graph.

4. The information processing apparatus according to claim 1, wherein the deletion unit deletes an event history representing an event a predetermined period or more before, from among event histories other than the event history selected by the selection unit.

5. The information processing apparatus according to claim 1, wherein the analysis unit repeatedly executes the analysis at a predetermined timing.

6. A control method executed by a computer, comprising:

an analysis operation of executing analysis for an event history set including a plurality of event histories;

a selection operation of selecting, from the event history set, an event history to be excluded from deletion targets, based on a result of the analysis; and a deletion operation of deleting, from the event history set, an event history other than the selected event history, wherein the control method further comprises:

in the analysis operation, matching events represented by each event history with a feature of an abnormal event indicated by predetermined feature information to calculate an abnormal degree for each event history obtaining an abnormal score for each event history based on the abnormal degree for each event history, comparing the abnormal score for each event history with a threshold score, and determining an event history with the abnormal score being equal to or more than the threshold score as an abnormal event; and selecting, in the selection operation, the event history indicating the abnormal event.

7. The control method according to claim 6, further comprising:

executing, in the analysis operation, a causal analysis for the event history indicating an abnormal event; and deleting, in the selection operation, from deletion targets, the event history indicating an abnormal event and the event history indicating an event having a causal relation with the event indicated by the former event history.

8. The control method according to claim 7, further comprising generating, in the analysis operation, a control flow graph or a data flow graph including an abnormal event, and excluding, from deletion targets, an event history relevant to each of events included in the generated control flow graph or data flow graph.

9. The control method according to claim 6, further comprising deleting, in the deletion operation, an event history representing an event a predetermined period or more before, from among event histories other than the event history selected by the selection operation.

10. The control method according to claim 6, further comprising repeatedly executing, in the analysis operation, the analysis at a predetermined timing.

11. A non-transitory computer readable medium storing a program causing a computer to execute each operation of a control method, the method comprising:

an analysis operation of executing analysis for an event history set including a plurality of event histories;

a selection operation of selecting, from the event history set, an event history to be excluded from deletion targets, based on a result of the analysis; and a deletion operation of deleting, from the event history set, an event history other than the selected event history, wherein the control method further comprises:

in the analysis operation, matching events represented by each event history with a feature of an abnormal event indicated by predetermined feature information to calculate an abnormal degree for each event history obtaining an abnormal score for each event history based on the abnormal degree for each event history, comparing the abnormal score for each event history with a threshold score, and determining an event history with the abnormal score being equal to or more than the threshold score as an abnormal event; and selecting, in the selection operation, the event history indicating the abnormal event.

* * * * *